United States Patent
Gallaher et al.

[11] Patent Number: 5,965,190
[45] Date of Patent: Oct. 12, 1999

[54] METHOD FOR IMPROVING THE TEXTURE OF TOMATO PASTE PRODUCTS

[75] Inventors: David M. Gallaher, deceased, late of Gurnee, Ill.; Kelly Lynn Gallaher, heir; David Edward Gallaher, heir, both of Kittanning, Pa.

[73] Assignee: Kraft Foods, Inc., Northfield, Ill.

[21] Appl. No.: 08/415,011

[22] Filed: Mar. 31, 1995

[51] Int. Cl.$^6$ .................................... A23L 1/212
[52] U.S. Cl. ........................ 426/615; 426/519; 426/520; 426/589; 426/658
[58] Field of Search ................... 426/615, 589, 426/658, 519, 520

[56] References Cited

U.S. PATENT DOCUMENTS

| | | |
|---|---|---|
| 2,557,050 | 6/1951 | Hassid ..................................... 426/577 |
| 3,976,805 | 8/1976 | Becker .................................... 426/599 |
| 4,556,576 | 12/1985 | Gaehring . |
| 5,011,701 | 4/1991 | Baer et al. . |
| 5,232,726 | 8/1993 | Clark et al. ............................. 426/519 |

FOREIGN PATENT DOCUMENTS

WO 96/11588  4/1996  WIPO .

OTHER PUBLICATIONS

Union Pump Co., Homogenizer Digest, Sep. 1990, vol. 8.
Thakur et al., *Effect of Homogenization Pressure On Consistency of Tomato Juice*, Purdue University, Dep. of Food Science, pp. 389–396.

*Primary Examiner*—Helen Pratt
*Attorney, Agent, or Firm*—Fitch, Even, Tabin & Flannery

[57] ABSTRACT

A method for high pressure, high shear homogenization of a tomato-based product, such as a ketchup or a sauce, is provided to increase the product's viscosity without significant loss of other important product characteristics, such as liquid retention, color, texture, etc. The method also provides for a homogenized tomato-based product with a significantly reduced tomato solid content, without loss of other important product characteristics. In one embodiment, a slurry of, among other components, a tomato paste, puree, juice or mixture of tomato solids, which may be blended and cooked at elevated temperatures, is introduced into a high pressure, high shear homogenizer and is homogenized at pressures from about 5,000 psi (345 bar) to in excess of about 14,500 psi (1000 bar) and is transferred to an appropriate dispensing container. In other embodiments, the tomato mixture may be blended with a food grade acid such as acetic acid (in the form of vinegar); and may include 4% corn syrup or 1% starch to increase or stabilize the viscosity of the product.

25 Claims, 7 Drawing Sheets

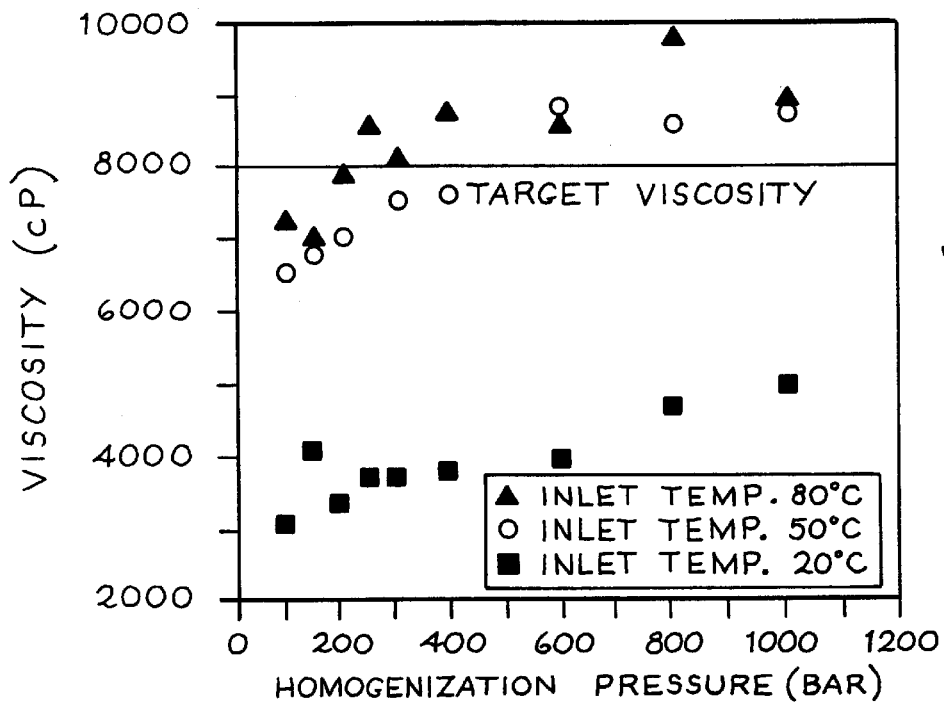
COMPARISON OF TOMATO KETCHUP VISCOSITIES AT THREE HOMOGENIZATION TEMPERATURES
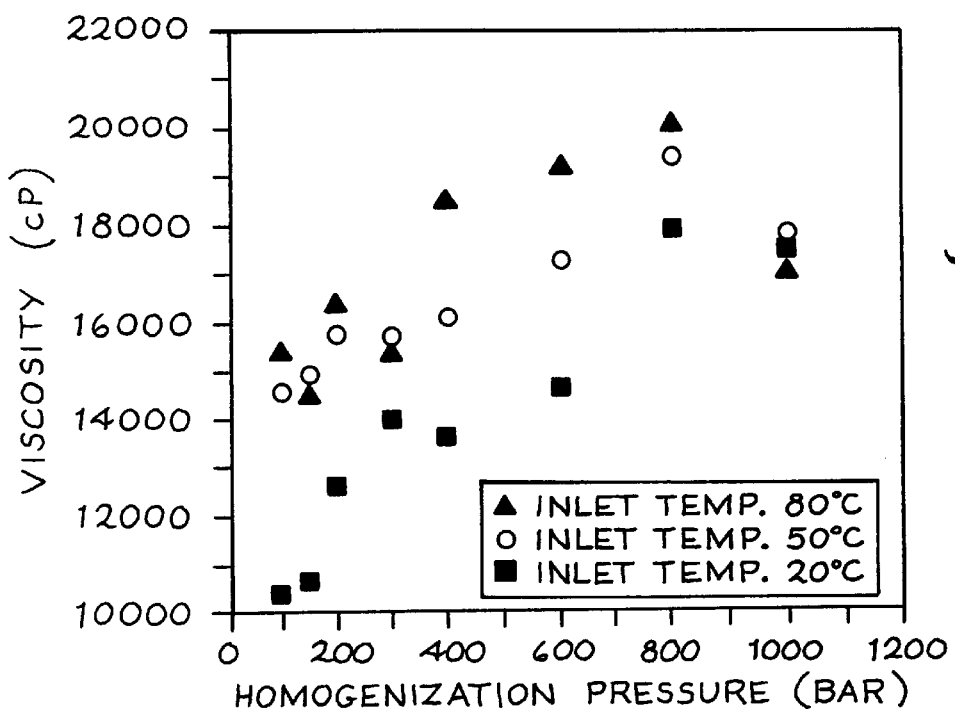
COMPARISON OF TOMATO KETCHUP VISCOSITIES AT THREE HOMOGENIZATION TEMPERATURES (2-3 WEEKS)

COMPARISON OF VISCOSITY OVER TIME
FOR FIVE KETCHUP SAMPLES

METHOD FOR IMPROVING THE TEXTURE OF TOMATO PASTE PRODUCTS

FIELD OF THE INVENTION

The present invention generally relates to the processing of tomato-based products, and more particularly to processing products containing tomato pastes, purees, sauces and/or juices for the purpose of improving the texture thereof.

BACKGROUND OF THE INVENTION

Many tomato-based products such as tomato ketchups, barbecue sauces, pizza sauces and other similar condiments are made using slurries of tomato pastes, tomato purees, tomato juices or similar compositions that contain substantial amounts of tomato solids. As used herein, sources of tomato solids generally comprise, but are not limited to, concentrates of one or a combination of the liquid obtained from mature tomato fruit (such as the fruit of *Lycopersilum esculentum* P. Mill); the liquid obtained from the residue from preparing tomatoes for canning; and the liquid obtained from the residue from the partial extraction of juice from tomatoes.

Tomato pastes, as used herein, refers to concentrates having a net total tomato solids content of at least about 24% by weight or more, or such other solids content generally recognized in the art as sufficient for a tomato paste. Tomato pastes intended for further processing into other food products generally contain about 30% to about 32% net total tomato solids. As referred to herein, a product's net total tomato solids content is typically determined by evaporative methods known to the art, such as microwave moisture analysis or evaporative oven analysis techniques.

Tomato puree, as used herein, refers to concentrates or products (if not concentrated) containing between about 8% to about 24% by weight tomato solids or such other solids content recognized as sufficient for tomato puree. Tomato juice, as used herein, refers to a concentrate or product (if not concentrated) having between about 5% to about 8% by weight tomato solids, or such other solids content recognized as sufficient for tomato juice. Such pastes, purees, sauces and juices may also contain salts, spices, sugars, thickeners, coloring and other such additives. Unless otherwise specifically identified, the above mentioned tomato products may be collectively referred to herein as "tomato sauces" or "tomato slurries".

The tomato solids in such tomato sauces or slurries typically include tomato pulp, comprising primarily water-insoluble tomato particles, tomato seeds and portions of tomato skins; tomato fibers which comprise the bulk of the tomato fruit; and pectin, a naturally occurring polysaccharide found in the tomato fruit. Each of these components affect the appearance, flavor and sensory appeal of tomato-based food products.

For example, the carotene pigment that gives tomato sauce its characteristic red color is found primarily in chromoplasts within the tomato pulp and tomato fiber. Hence, the amount and distribution of the pulp and fiber will determine whether the tomato sauce will have an overall, even desirable color. In addition, the size and distribution of the tomato pulp particles may also affect the texture of such tomato-based products. Large, unevenly distributed pulp particles will tend to produce a lumpy product, while extremely finely divided pulp particles will tend to produce a smooth textured product.

Similarly, the tomato fibers tend to link together and intertwine to form a lattice network or fibrous matrix that provides body and viscosity to tomato-based products and further traps free liquid which would otherwise "weep", i.e. separate, from the product. The liquid typically consists primarily of water and may also include other tomato fluids, and additives to the product. When present in sufficient concentrations, the pectin in tomato-based products forms a gel that also acts to bind free liquid in the products and to increase the products' viscosity.

In addition, tomato pastes, as well as other tomato-based products, may be identified by their "screen size". This is an indication of the average maximum size of particulate matter in the product such as tomato fibers, skin sections, and seeds. For example, a 0.060 screen tomato paste refers to a paste that was passed through a screen with 0.060 inch diameter openings, and a 0.045 screen tomato paste refers to a paste passed through a screen with 0.045 inch diameter opening.

It is known to modify the physical properties of the tomato solids in tomato sauces and slurries using various techniques, including homogenization of the products. The treatment of tomato slurries with homogenizers was known to affect the size and distribution of tomato pulp particles, the nature of the fibrous materials in the tomato solids, and the amount of pectin released from the tomato solids. For example, when properly applied, homogenization may finely divide, break down and disperse pulp particles through out a slurry to produce products with acceptable colors and textures.

It further was recognized that homogenization of the products affects the matrix or lattice network created by the interlinking of tomato fibers. As with other types of processing, homogenization tends to reduce the length of individual tomato fibers and to fray or fibrillate the ends of those fibers. Under the proper conditions, homogenization will sufficiently fibrillate the tomato fibers to permit the frayed ends of those fibers to absorb and hold greater amounts of liquid in the product and to prevent weeping of liquid from the product.

It also was recognized that homogenization of a tomato slurry may release additional pectin from the tomato pulp and fibers and more evenly distribute that gel-forming compound throughout the product. This typically increased the viscosity of the product and the amount of serum retained by the product. Thus, it was recognized that when homogenized under the proper conditions, tomato sauces could attain viscosities equal to that of unhomogenized products containing 10–15% more net total tomato solids.

However, it was recognized that the homogenization conditions must be carefully balanced to avoid undesirable side effects. Such side effects include overprocessing the tomato sauce or slurry so that it loses its desirable texture and becomes too smooth. Overprocessing with a homogenizer further reduces the length of the fibrous materials within a tomato-based product to the point where those fibers cannot effectively form a lattice network in the product. This may result in an unacceptable color, texture and appearance, and a failure of the product to trap and hold significant amounts of tomato liquid.

Hence, the homogenization conditions, particularly homogenization pressures, were carefully controlled to balance the advantages of increased uniformity and increased viscosity with the potential for overprocessing and damage to the viscosity enhancing elements of the tomato solids. When preparing tomato-based products, the generally recommended maximum homogenization pressures were typically from about 2,500 psi (172 bar) to about 3,000 psi (207 bar), and it was believed that homogenization at pressures greater than about 3,000 psi (207 bar) should be avoided. (All references to pressure herein are to gauge). Homogenization at higher pressures was believed to provide some increase in the viscosity of the tomato-based products, but also produced unacceptable degradation of other important product properties, such as those mentioned above. Other alternative processing steps were used to supplement the effects of homogenization, including the additional steps of milling the products or using of vacuum expansion chambers to increase viscosity and improve the color of the products. In addition, food grade acetic acids and citric acids were sometimes used as pretreatment additives to improve the viscosity of such tomato sauces.

As discussed below, the present invention provides a method for high pressure, high shear homogenization of tomato sauces at pressures well in excess of the previously recommended maximum of about 3,000 psi (207 bar). The invention provides tomato-based products with viscosities in excess of products with similar tomato solids content homogenized at lower pressures, and without the deleterious effects described by others in the art. Furthermore, the invention is capable of providing a product with a reduced tomato solids content but with a viscosity, and other physical characteristics comparable to products with a significantly higher tomato solids content.

SUMMARY OF THE INVENTION

One object of the invention is to provide a method for high pressure, high shear homogenization of a tomato-based product, such as a ketchup or a sauce, to produce an increase in the products viscosity without significant loss of other important product characteristics, such as liquid retention, color, texture, etc.

Another object of the invention is to provide a method for making a homogenized tomato-based product with a significantly reduced tomato solid content, without loss of other important product characteristics, such as viscosity, liquid retention, color, texture, etc.

Another object of the invention is to provide a method for making a homogenized tomato-based product at significant cost savings.

Further and additional objects will be apparent from the following description, drawings and claims.

In one embodiment of the invention, a slurry of, among other components, a 0.060 screen tomato paste, puree, juice or mixture of tomato solids (with a preferred net total tomato solid content of about 27% to 31% although reduced amounts may be used), which has been blended and cooked at elevated temperatures is introduced into a high pressure, high shear homogenizer, such as a Rannie™ homogenizer (APV Rannie, Copenhagen). The tomato slurry is homogenized at pressures from about 5,000 psi (345 bar) to in excess of about 14,500 psi (1000 bar), and preferably between about 5,000 psi (345 bar) to about 11,000 psi (759 bar), and most preferably about 6,500 psi (448 bar) to about 11,000 psi (759 bar). The resulting product is then transferred to an appropriate dispensing container, or is mixed with other flavorings, additives or the like and is subsequently transferred to such containers.

In another embodiment, a 0.060 screen tomato paste or slurry (with a preferred net total tomato solid content of about 22% or more) is introduced into a high pressure, high shear homogenizer, such as a Rannie™ homogenizer, prior to cooking or exposing the sauce or slurry to significant heat treatments. The tomato slurry is homogenized at pressures from about 5,000 psi (345 bar) to in excess of about 14,500 psi (1000 bar), and preferably between about 5000 psi (345 bar) to about 8000 psi (552 bar). The resulting product is then transferred to appropriate cooking apparatus or other processing apparatus for preparation as a tomato-based product such as a barbecue sauce or other condiment.

Using the invention, such tomato slurries and sauces (typically with screen sizes of greater than about 0.045) may be prepared using amounts of tomato solids that are 10% to 20% less than the net total tomato solids present in other conventional products. The slurries and sauces may be processed using high shear, high pressure homogenization prior to, as well as after, cooking or other heat treatments. Further additives, such as spices, food grade acids and salts also may be added to the product. The invention also allows the preparation of tomato sauces and slurries with a predetermined amount of tomato paste (with tomato solids content greater than about 5 % by weight), that will have a predetermined expected Brookfield viscosity.

In an additional embodiment, a tomato slurry, puree or mixture of tomato solids (having a screen size of at least 0.045 and with a tomato solids content greater than about 5 % by weight) and other components, such as sugars, spices, salts etc., is prepared and introduced into a high pressure, high shear homogenizer, such as a Rannie™ homogenizer, at pressures from about 5,000 psi (345 bar) to in excess of 14,500 psi (1000 bar), and preferably between about 7,000 psi (483 bar) to about 11,000 psi (759 bar), and most preferably at least about 8,000 psi (552 bar). The resulting product is then blended with a food grade acid such as acetic acid (in the form of vinegar), a 4% corn syrup or a 1% starch to increase or stabilize the viscosity of the product. The product may also be deaerated and then be bottled or mixed with other flavorings, additives or the like.

BRIEF DESCRIPTION OF THE DRAWING

FIG. 5 is a plot of homogenization pressure (in bar) versus viscosity of a tomato ketchup product processed in accordance with the invention at homogenizer inlet temperatures of 20° C., 50° C. and 80° C.

FIG. 6 is a plot of homogenization pressure (in bar) versus viscosity after two to three weeks of a tomato ketchup product processed in accordance with the invention at homogenizer inlet temperatures of 20° C., 50° C. and 80° C.

It should be understood that the drawings are not necessarily to scale. In certain instances, details for the actual structure and method steps which are not necessary for the understanding of the invention have been omitted. It should be understood, of course, that the invention is not necessarily limited to the particular embodiments illustrated herein.

DETAILED DESCRIPTION OF THE INVENTION

Figure 1:
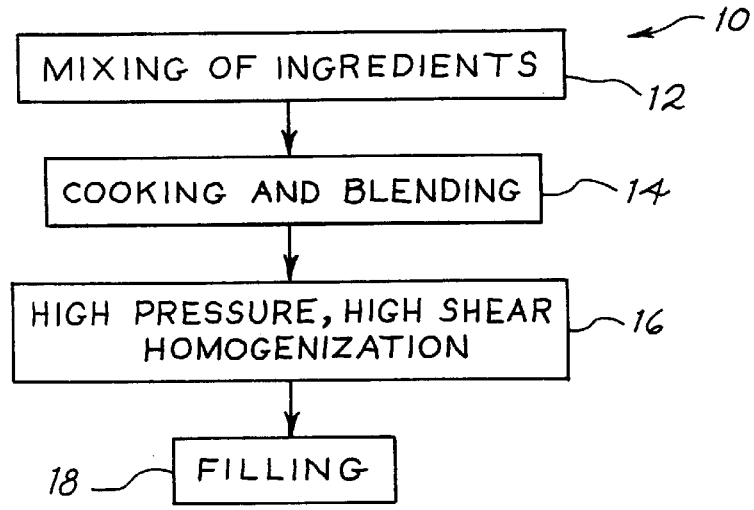
FIG. 1 is a schematic block drawing of one embodiment of the method of the invention for processing tomato-based products.
Figure 2:
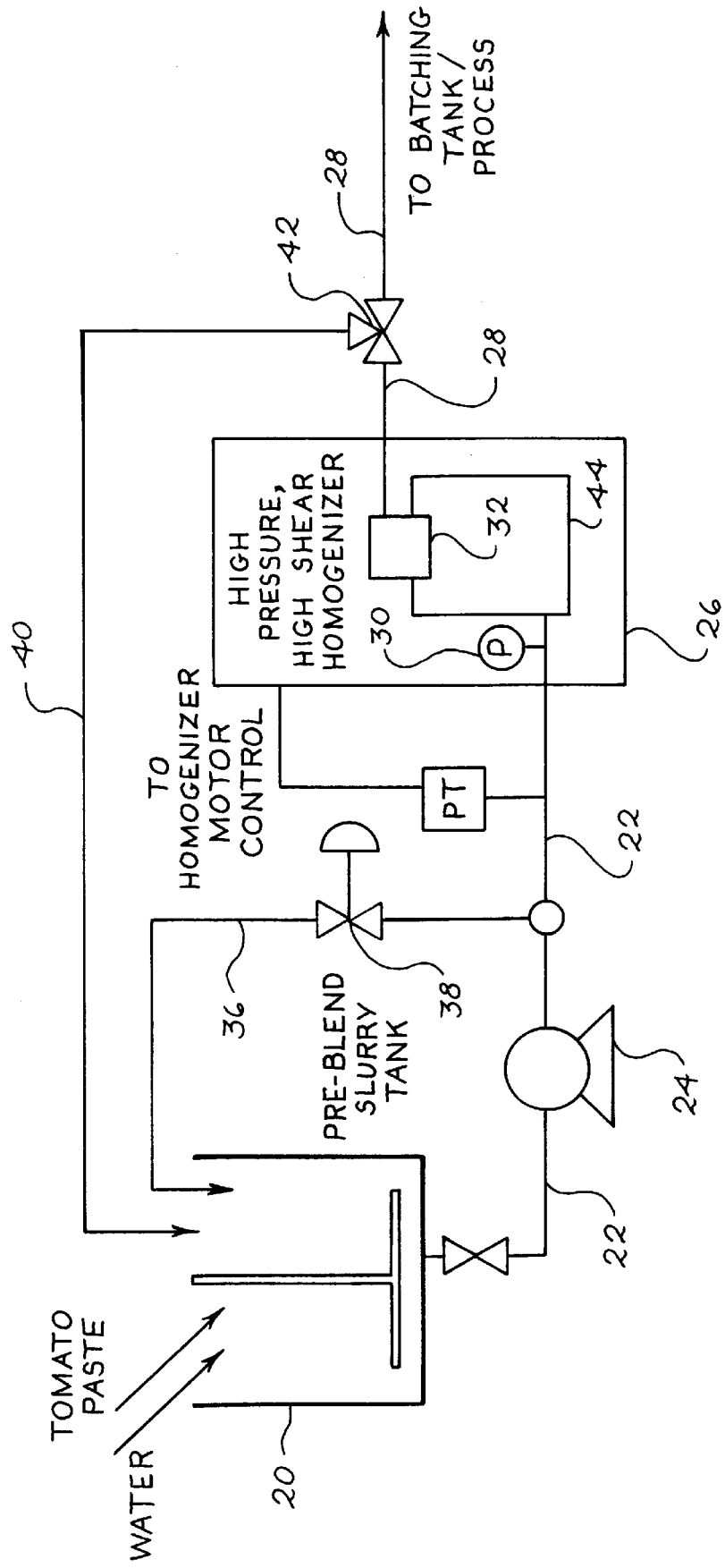
FIG. 2 is a more detailed flow chart of an embodiment of the method of the invention.

Referring now to the drawings, and more particularly FIGS. 1 and 2, one embodiment of the invention 10 is shown in the block schematic of FIG. 1 which may be carried out pursuant to the flow diagram of FIG. 2. As shown in FIG. 1, a tomato-based slurry or sauce is typically prepared from a tomato paste, puree or juice mixed with water in a mixing step 12. The tomato solids content of such tomato pastes, purees or juices may vary, but they preferably comprise between about 4% and about 34% by weight net total tomato solids, and preferably between about 20% and about 32% by weight. (Unless otherwise stated, all percents herein are weight percents). The remainder of the tomato pastes, purees or juices used as starting materials may include water and other components such as spices, salts, sweeteners or other such additives which are added to make a particular type of end product. Those additional components may also be separately added during the mixing step 12 or after the tomato sauce or slurry is homogenized as discussed below.

Of course, the tomato solids content of the source materials may be increased or decreased, depending on the particular application. Some difficulty in transporting tomato slurries or sauces with a tomato solids content greater than about 32% through the conduits and piping used in some handling systems may present a practical limitation on the net total tomato content of the tomato slurries or sauces homogenized in accordance with the invention. However, the benefits of homogenization of tomato-based slurries or sauces as discussed herein are also available for such slurries and sauces with a net total tomato content greater than 32% where systems are available to transport tomato slurries or sauces with such a tomato solids content.

The source for the tomato solids, i.e. the paste, puree or juice, may be prepared from tomato fruit subject to either the "hot break" or "cold break" process. In both processes, a juice is prepared by macerating tomato fruits and then passing the macerate through conventional equipment to separate seeds, skins and other debris. The juice is then concentrated by conventional methods such as vacuum heating. In the "hot break" method, the tomato fruits are heated either during maceration or immediately thereafter to deactivate enzymes that would otherwise degrade the cellular structure of the tomato solids and the viscosity enhancing properties of the pectin present in the tomato solids. In the cold break method, tomato fruits are macerated and processed at ambient temperatures. For the purposes of the present invention, tomato pastes or juices prepared from tomatoes treated using the "hot break" method are preferred.

The screen size of the tomato slurry or sauces used in the invention may vary, but is preferably greater than about 0.045, and most preferably is about 0.060 when tomato paste is used as the source of the tomato solids. As mentioned above, the screen size of a tomato slurry or sauce is one indication of the amount and size of tomato seeds, tomato skin portions and tomato fibers present in the slurry or sauce. In some applications, it is desirable to provide a slurry or sauce with a greater screen size, i.e. larger particles of seed, skin and tomato fibers, prior to the homogenization step discussed below. Such slurries and sauces provide additional fibrous materials for viscosity enhancing tomato fiber matrices formed by high pressure, high shear homogenization as discussed below. In other application, it may be desirable to use slurries and sauces with a smaller screen size for reasons of cost, efficiency and the particular end product to be produced. Furthermore, the invention is not limited to tomato-based products with a particular solids content or screen size, so long as that product contains sufficient tomato solids and tomato fibers to produce an increase in viscosity when subject to the high pressure, high shear homogenization discussed below.

In applications where the slurry or sauce is cooked prior to homogenization, the tomato slurry prepared during the mixing step 12 is typically heated to a predetermined temperature for a period of time during a cooking step 14 to further blend the ingredients of the tomato slurry, reduce the water content of the slurry or to otherwise process the slurry. Depending on the expected end product, the cooking step 14 may be omitted and the slurry or sauce may be homogenized after any required blending is complete. The mixed tomato slurry or sauce then is transferred to a homogenization apparatus for the next step 16, the high pressure, high shear homogenization of the slurry or sauce. An example of a homogenization apparatus is described below in connection with FIG. 3, as are the conditions and procedures used in that step.

After the homogenization step, the tomato slurry is transferred to a filling apparatus for a filling step 18 where the slurry is transferred to appropriate packaging materials such as bottles, cans, or other such packaging appropriate for dispensing the end product. Alternatively, the homogenized tomato slurry may be transferred to holding tanks or other containers for further processing and blending with other ingredients, as well as for cooking. The slurry, in addition, may be held for packaging at a later time.

The flow chart in FIG. 2 provides a more detailed summary of one embodiment of the invention. As shown in FIG. 2, an about 0.060 screen size tomato paste having a net total tomato solids content of between about 20% and about 34% is blended with water and other additives (if necessary) in a pre-blend tank 20 with the tomato paste. Depending on the desired end product, tomato pastes or tomato-based products with lower net total tomato solids content may be used. Sufficient water and additives are mixed to achieve a tomato slurry with an appropriate net total tomato solids content of between about 7% and about 31%, depending on the desired end product. In fact, the maximum tomato solids content of a sauce or slurry that has been treated in accordance with the invention was about 31% to 34% net total tomato solids. This limitation is due to the limits of the particular piping (about 1.5–2 inches (3.8–5.1 cm) diameter), the pumps and the dimensions of the Rannie™ 30.79H apparatus discussed above, not of the invention. With the proper equipment, it should be possible to process pastes or slurries with a greater amount of tomato solids.

The pre-blend tank 20 also may be provided with a water or steam jacket, or other heating and cooling source, to regulate the temperature of the tomato slurry or sauce. Such temperature regulated tanks further may be used to heat the slurry for the cooking step 14 discussed above to eliminate the need to transfer the tomato slurry or sauce to other heating apparatus.

The blended tomato slurry is conducted via conduit 22 by a positive displacement pump 24 (or other pumping devices) to a high pressure, high shear homogenizing unit 26. The processed, homogenized slurry is directed from the homogenizing unit 26 to a packaging station, a holding tank, or apparatus for further processing the slurry by exit line 28. The homogenizing unit 26 also includes a pressure sensor 30 to monitor the feed pressure of the tomato slurry entering the high pressure, high shear homogenizer 32. In this embodiment, the preferred feed pressure is from about 50 psi (3.5 bar) to about 200 psi (13.8 bar), and most preferably about 90 psi (6.2 bar) to about 120 psi (8.3 bar). The flow rate typically is from about 5 lbs/min. to about 30 lbs/min. depending on the application and homogenizer used. In other embodiments, the preferred feed pressures and flow rates may be greater or less than the above ranges.

If the pressure sensor 30 detects that the feed pressure has dropped below the preferred minimum, here about 60 psi (4 bar), then a pressure switch 34 will disable the homogenizer 32. Should the homogenizer 32 be disabled for that or another reason, the tomato slurry is directed through the divert conduit 36 by divert valve 38 back to the blending tank 20. In addition, the homogenized tomato slurry may be directed back into the blend tank 20 by return line 40 through return valve 42 to maintain the preferred feed pressure to the homogenizer 32. In this embodiment, the homogenizer unit 26, in addition, may be provided with a recirculation line 44 to redirect homogenized slurry back through the homogenizer 32.

The preferred high pressure, high shear homogenizer 32 uses a knife edge homogenization element or valve within a closely surrounding impact surface, such as a ring member. As mentioned above, the preferred homogenizer is supplied by APV Rannie (Copenhagen) and includes the Rannie™ 12.51H or the Rannie™ 30.79H homogenizers, which are operated pursuant to the specifications supplied by APV Rannie. The Rannie™ 12.51H homogenizer uses pistons having an about 12 mm diameter and about 50 mm stroke length to feed the tomato slurry into the homogenization valve. The Rannie™ 30.79H homogenizer uses pistons having an about 30 mm diameter and an about 79 mm stroke length for that purpose. Other homogenization elements and other homogenizers, such as those produced by Bran-Leubbe, capable of producing similar high pressure, high shear homogenization treatments to tomato-based products also may be used.

Figure 3:
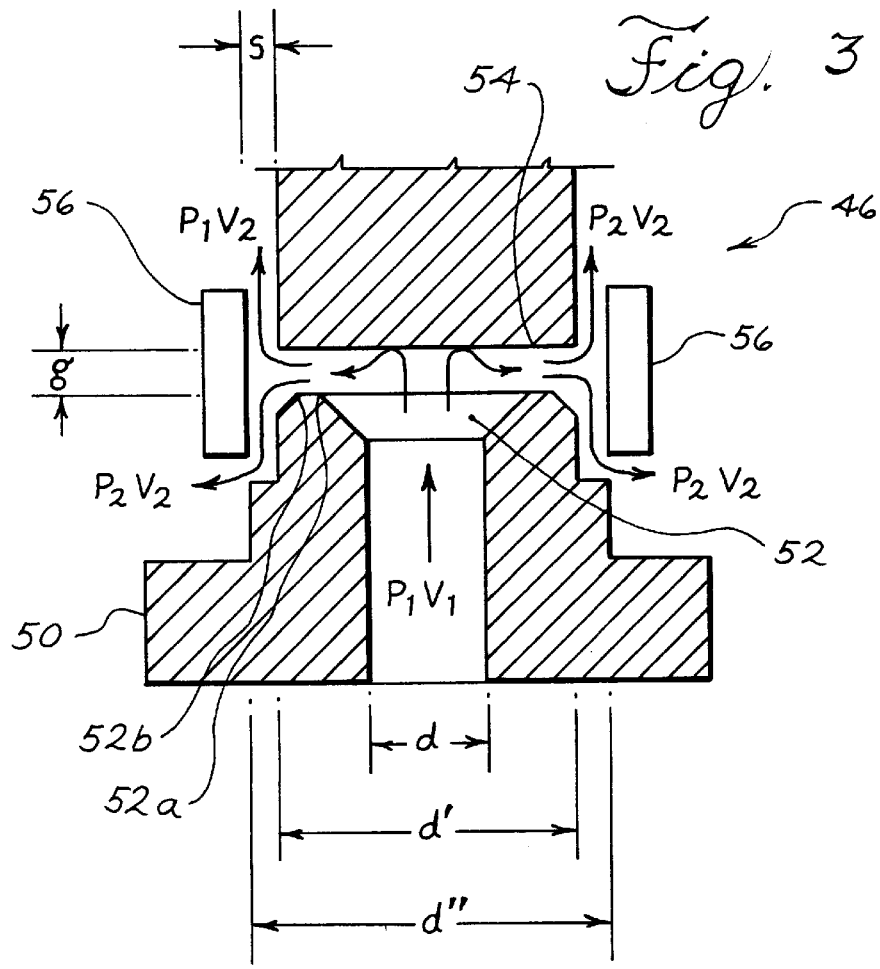
FIG. 3 is a cross-sectional view of a high pressure, high shear homogenizer useful in the practice of the invention.

A cross-section of a homogenization element 46 of a high pressure, high shear homogenizer 32 such as a Rannie™ homogenizer is shown in FIG. 3. As used in the embodiment shown in FIG. 2, the tomato slurry enters the homogenization element 46 through an orifice 48 located in a lower valve seat 50. In the preferred Rannie™ 12.51H and 30.79H homogenizer valves, the orifice 48 typically has a diameter d, which is about 3.9 mm in the Rannie™ 12.51H and about 8 mm in the Rannie™ 30.79 homogenizer. The orifice diameter increases to d' at the orifice opening 52 mm to about 8 mm in the Rannie™ 12.51 and to about 16 mm in the Rannie™ 30.79H, forming a first inner knife edge 52a. The valve seat 50 further includes a second outer knife edge 52b, radially spaced from the inner knife edge 52a, about 1.5 mm in the Rannie™ 30.79H and about 2 mm in the Rannie™ 30.79 homogenizer, with an overall diameter d" of about 10 mm in the Rannie™ 12.51 and about 17.5 in the Rannie™ 30.79.

The preferred valves further comprise or are coated with a wear resistant material such as ceramic materials including zirconium oxides. The materials, diameters and spacing of the orifice 48 and orifice opening 52, and the spacing of the knife edges 52a and 52b may be varied depending on the application, the size and capacity of the homogenizer, the nature of the source materials for the tomato solids, and the type and content of the tomato-based product desired.

As the tomato slurry proceeds through the orifice 48, it exits the orifice opening 52 and impacts on an upper valve face 54 and the knife edges 52a and 52b. The diameter of the upper valve face typically depends on the dimensions of the lower valve portions. For example, in the Rannie™ 12.51H homogenizer the diameter of the valve face 54 is about 12 mm. The gap g between the valve face 54 and the valve seat 50 is preferably from about 0.005 mm to about 0.100 mm when the homogenization element 46 is operating at the desired pressure and flow rate. This distance may be varied using the homogenizer's control system, which is a hydraulic system in the Rannie™ homogenizers, depending on the conditions of a particular processing run, and depending on the tomato-based product desired, as well as the procedures used to achieve the desired homogenization pressures.

It is preferred that the target homogenization pressures be achieved by closing the gap g between the upper valve face 54 and the valve seat 50 from a first position, to one or more additional positions over a period of time until the desired homogenization pressure is obtained. For example, the Rannie™ homogenizer's hydraulic controller may be used to close the gap between the valve face 54 and the valve seat 50 to a distance g' that will produce a homogenization pressure that is about one-third of the target pressure. This gap g' is maintained for a period of time and is then further closed to the gap g to obtain the target pressure.

During the operation of the homogenization element in the above example, the valve face 54 and the valve seat 50 cause an abrupt change in direction of flow of the tomato slurry stream, causing it to contact the impact ring 56 at high velocities (which may approach the speed of sound). Generally, the pressure P1 and velocity V1 of the tomato paste slurry entering the orifice 48 is sufficient to produce an exiting pressure from the orifice opening 52 of at least about 5,000 psi (345 bar) to about 14,000 psi (966 bar), and preferably at least 5,000 psi (345 bar) to about 11,000 psi (759 bar), and most preferably at least about 6,500 psi (448 bar) to about 11,000 psi (759 bar).

The spacings between the impact ring 56, and the valve seat 50 and upper valve face 54 is preferably about 0.5 mm to about 4.0 mm. For example, in the preferred Rannie™ 12.51H and 30.79H homogenizers the valves and impact rings are spaced about 3 mm and about 4.2 mm from their respective outer knife edges 52b. This spacing may be varied depending on the desired homogenization methods, the nature of the desired end product, and the nature and consistency of the tomato slurry prepared for homogenization. The pressure P2 of the departing tomato paste slurry is substantially atmospheric and the velocity V2 of the tomato slurry stream is typically in the range of from about 750 (229 meters) to about 2,000 feet (610 meters) per second.

The inlet temperature of the tomato slurry as it enters the homogenizer 32 also is preferably controlled within a predetermined range. The preferred range is about 20° C. to about 80° C., and preferably between about 70° C. to 80° C. for tomato slurries intended for use in products such as tomato ketchups. These temperature ranges may be increased or decreased for other types of tomato-based products, and for other applications. In most instances, the homogenized slurry leaving the homogenizer element 46 will be at elevated temperatures as a result of the homogenization process. The slurry may be cooled by conventional heat exchangers or may be packaged at such temperatures.

Figure 4:
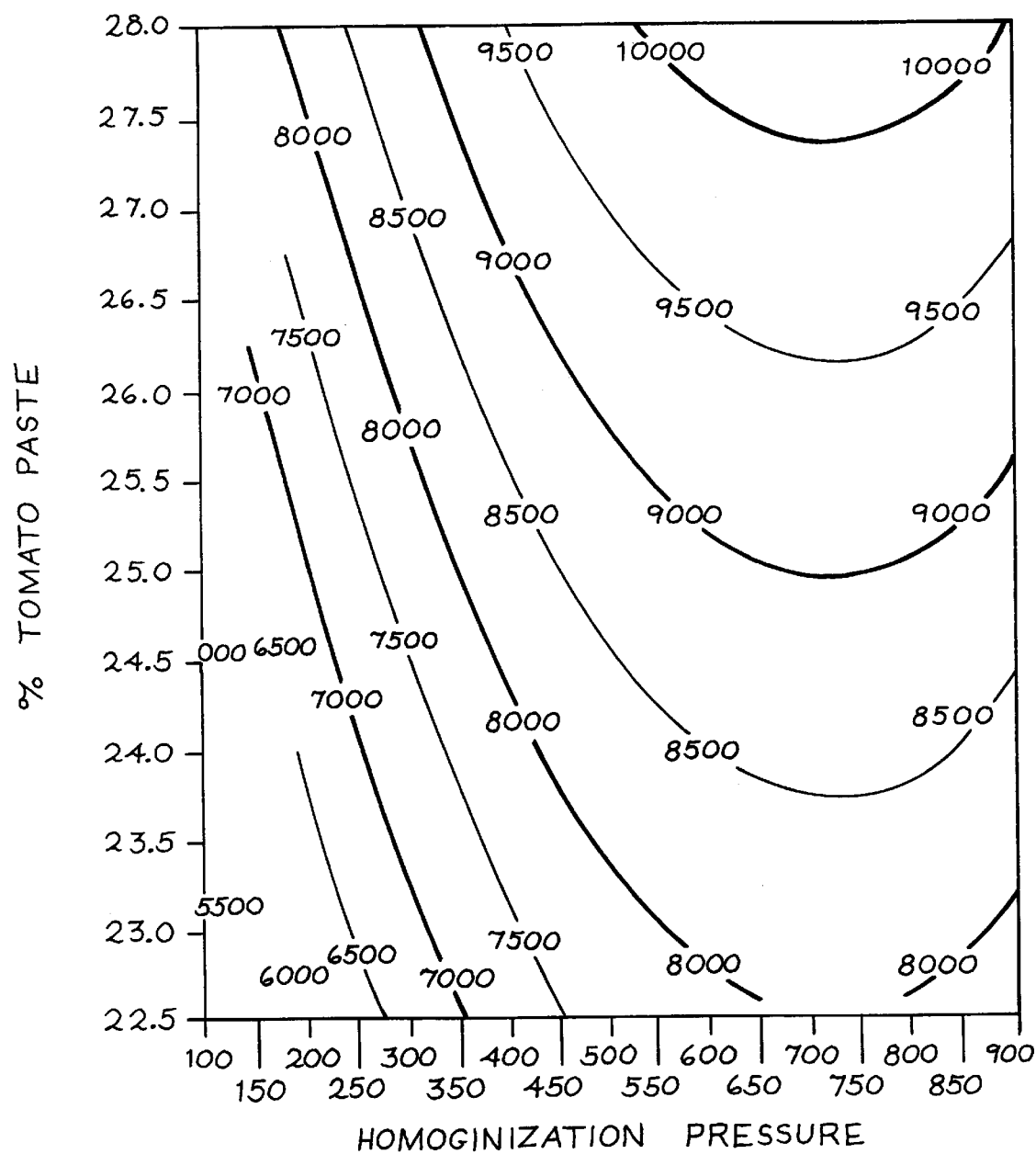
FIG. 4 is a plot of homogenization pressure (in bar) versus percentage of tomato paste indicating the predicted Brookfield viscosity of a tomato ketchup product processed in accordance with the invention.

As shown in FIG. 4, it is possible to develop a contour plot of homogenization pressure (shown in bar) versus the tomato paste percentage content of a tomato-based product such as tomato ketchup. The contour plot shows expected Brookfield viscosities of product processed using the method of the invention, based on the stated pressures and tomato paste percentages. The experimental data and the formulae used to develop the contour plot is reported below in Example 2. Using such a contour plot, one may optimize tomato paste (and therefore the tomato solids) content, homogenization pressures and the expected viscosities that may be obtained for a particular product using the invention. As discussed below, the net total tomato solids content in the tomato paste used to develop the data for the plot was about 27% to about 31%.

Also as discussed below in the Examples, the viscosities of tomato-based products processed using the above procedures are significantly increased when compared to similar products that are homogenized at lower pressures. As shown in FIG. 5, such increased viscosities may be observed after the products leave the homogenization unit 26. As shown in FIG. 6 further viscosity improvements are observed when the homogenized products are held in containers or in storage vats over a period of time, normally two to three weeks.

As further discussed below and shown in FIGS. 9 and 10, the viscosity of tomato-based products, such as ketchups, may be increased by the addition of vinegar after the above-mentioned high pressure, high shear homogenization step. The addition of 1% by weight of starch or 4% by weight of a corn syrup after homogenization may also increase the viscosity of such products and may reduce weeping and serum separation in the products subject to the above described high pressure, high shear homogenization. Moreover, as shown in FIG. 11, additional processing steps such as a deaeration step to remove excess air or gases entrained in the product stream may be used to improve the viscosity and overall properties of tomato slurries or sauces processed as described above.

The examples listed below are only for the purposes of illustration of the method and product of the invention they are not intended to limit the nature or scope of the invention.

EXAMPLE NO. 1

In this example, a mixture of ingredients for a tomato ketchup product was prepared, blended and cooked and then was subjected to high pressure, high shear homogenization pursuant to the method of the invention. The formula for the ketchup product was as follows in Table 1:

TABLE 1

Tomato Ketchup Formula

| Ingredients | Percentage In Sample | Pounds Used |
|---|---|---|
| Water | 21.88–40.28 | 21.88–40.28 |
| Tomato Paste (about 20–34% tomato solids) | 25.00–43.40 | 25.00–43.40 |
| Sugar and other sweeteners | 16.00 | 16.00 |

TABLE 1-continued

Tomato Ketchup Formula

| Ingredients | Percentage In Sample | Pounds Used |
|---|---|---|
| Vinegar (about 12% acidic acid) | 6.67 | 6.67 |
| Salt | 2.60 | 2.60 |
| Spices | .27 | .27 |
| Condensate (water from steam inject. heating) | 9.18 | 9.18 |
| Total | 100.00 | 100.00 |

The tomato paste used for this example contained about 31% net total tomato solids and had a 0.060 screen size. The final mixture contained about 8.68% tomato solids, after the additions of water, sugars and sweeteners, and the other ingredients listed above.

Pursuant to the steps illustrated in the schematic of FIG. 1, the above ingredients were pre-weighed and blended at about 45° C. in a mixing kettle provided with steam injection heating ports. The ingredients were added in the following order: water, tomato paste, and then the remaining ingredients, with a short blend time between each addition. The mixture was then blended for approximately three minutes before being cooked by steam injection heating to a target temperature of about 92° C. The cooked mixture was transferred to a water jacketed kettle, which cooled the mixture to three different target temperatures of about 80° C., 50° C. and 20° C., for feeding into the inlet of a Rannie™ 12.51H homogenizer.

A set of samples of the cooked tomato ketchup mixtures at each different inlet temperature, was homogenized at pressures of about 100 bar (1,450 psi), 150 bar (2,175 psi), 200 bar (2,900 psi), 400 bar (5,800 psi), 600 bar (8,700 psi), 800 bar (11,600 psi) and 1,000 bar (14,500 psi). The first set of samples homogenized at those pressures were fed into the homogenizer at an inlet temperature of about 80° C., the second set of samples were at an inlet temperature of about 50° C., and the third set of samples were at an inlet temperature of about 20° C. The data from each of the three sets of samples is summarized at FIGS. 5 and 6.

After they were homogenized, the three sets of samples were maintained at temperatures exceeding about 75° C. and were transferred into pourable salad dressing bottles for further analysis and storage. This analysis included a determination of the Brookfield viscosities of the homogenized tomato ketchup samples immediately after homogenization which is shown in FIG. 5 and then two to three weeks later which is shown in FIG. 6.

In addition, a visual analysis of the samples showed a decrease in the numbers of chromoplasts holding the red colored carotene pigment in the tomato solids, thus indicating a desirable improvement in the distribution of the red carotene pigment throughout the samples. Fewer plant cell walls were also noticed at the higher homogenization pressures. Overall, the particulates in the samples were finer in size as homogenization pressure increased.

A comparison of the data shown in FIG. 5 for samples processed at homogenization pressures of less than about 206 bar (2,987 psi) with those processed at higher pressures demonstrates that significant gains in viscosity are produced by homogenizing the above ketchup mixture at pressures above about 350 bar (5,075 psi), and at inlet temperatures of about 50° C. and 80° C. There also was a significant increase in the viscosities of the samples introduced to the homogenizers at an inlet temperature of about 20° C., but at homogenization pressures in excess of about 600 bar (8,700 psi). Thus, significant improvements in the samples' viscosity were produced at homogenization pressures well in excess of the homogenization pressures of about 3,000 psi (207 bar) that were previously thought to be an upper limit, without significant degradation to other characteristics of the product. Also the data shown in FIG. 5 further indicates that the inlet temperatures of the homogenizer will affect the overall viscosities of the samples. Generally, the higher the inlet temperature, the greater the viscosity of the product.

The "target viscosity line" of FIG. 5 designates a viscosity of tomato ketchup products available commercially at retail stores. Such products typically have a tomato solid content about 10% to 15% greater than the mixture described above. The data of FIG. 5 shows that at inlet temperatures of about 80° C. and 50° C., the viscosity of the above mixture will exceed that target viscosity when homogenized at pressures in excess of about 400 bar (5,800 psi) and 500 bar (7,250 psi) respectively. Hence, using the method of the invention one may produce ketchup products having viscosities similar to commercially available tomato ketchup products, with a savings of 10% to 15% in tomato solids.

The data of FIG. 6 demonstrates the increase in viscosity in the above samples when stored for two to three weeks in bottles. Each of the samples evidenced very significant increases in viscosities, even those homogenized at pressures less than about 400 bar (5,800 psi). However, that data also shows that significantly increased viscosities may be obtained by homogenization at pressures greater than about 400 bar (5,800 psi).

The data of FIG. 5, in addition, suggests that a decrease in measured viscosity of the samples at the inlet temperature of about 80° C. that were homogenized at pressures exceeding about 800 bar (11,600 psi). That data did not reflect a similar reduction in viscosity for the samples at the lower two inlet temperatures. The data of FIG. 6 indicate that after 2 to 3 weeks the samples at all three inlet temperatures which were homogenized at pressures in excess of about 800 bar (11,600 psi) exhibited a drop in viscosity relative to those samples homogenized at less than about 800 bar (11,600 psi). In fact, the samples at each of the three inlet temperatures homogenized at about 1,000 bar (14,500 psi) exhibited similar viscosities after 2 to 3 weeks.

EXAMPLE 2

Several of the samples from the tests described in Example 1 above evidenced some liquid or serum separation. Additional procedures were developed to determine whether the liquid or serum separation was a function of its solution properties, including salt concentration, vinegar concentration and level of tomato paste, as well as homogenization pressure. Following the method described in FIG. 1 above, tomato ketchup samples were made with a composition similar to that of Example 1. However, several variations on the basic mixture were made using three different amounts of salt, vinegar and tomato paste. The levels of salt, vinegar and tomato paste are indicated below and were used in different combinations in each sample:

| | | | |
|---|---|---|---|
| Salt | 1.3% | 1.95% | 2.6% |
| Vinegar | 3.33% | 5.00% | 6.67% |
| Tomato Paste | 22.61% | 25.31% | 28.00% |

The tomato paste used to prepare the above mixtures contained about 31% net total tomato solids and also had a 0.060 screen size. Hence, the final samples made with about 22.61% tomato paste contained about 7.01% net total tomato solids. The samples made with about 25.31% tomato paste contained about 7.85% net total tomato solids. The samples made with about 28% tomato paste contained about 8.68% net total tomato solids.

The samples were blended at 45° C. as discussed above in Example 1 and cooked at 80° C. (rather than 90° C. as in Example 1). A portion of each mixture was homogenized in a Rannie™ 12.51H homogenizer at pressures of about 100 bar (1,450 psi), 500 bar (7,250 psi) and 900 bar (13,050 psi) and the samples were dispensed into glass bottles while at temperatures exceeding 75° C.

The textures of homogenized samples were rated on a scale of 1 (good) to 5 (very poor) and the sample PH, conductivity and viscosity (using a Brookfield measuring device, with spindle #4 at 20 rpm) were measured. The liquid or serum separation of the samples was also rated on a scale of 1 (small separation) to 7 (large separation) using a blot test, i.e. an examination of the size of the liquid circle left after a predetermined amount of sample (about 1 gram) was placed on standard blotting paper for a defined time (about 1 hour). As a measure for comparison, current commercially available ketchups were also studied to determine their properties as well.

Each run was executed in random order in a pilot plant. The formula and conditions for each sample are as follows, where "Serum" refers to liquid or serum separation rating, "Cond." refers to conductivity (which was used as a measure of free salt ions), "Text." refers to texture rating, "Per." refers to percentage of a component, and "Vin." refers to vinegar, and "Tom. Past." refers to tomato paste:

TABLE 2

Results Of Study Of Properties Of Tomato Ketchup Mixtures Of Example 2

| Sample # (in order tested) | Homog. Press. (in bar) | Viscos (Brook.) | Serum | Cond. | Text. | pH | Salt Per. | Vin. Per. | Tom. Past. Per. |
|---|---|---|---|---|---|---|---|---|---|
| 6 | 100 | 5430 | 5 | 26.8 | 5 | 4.02 | 1.3 | 3.33 | 22.61 |
| 12 | 100 | 7650 | 4 | 25.3 | 3 | 4.05 | 1.3 | 3.33 | 28.00 |
| 23 | 100 | 5040 | 7 | 24.2 | 5 | 3.86 | 1.3 | 6.67 | 22.61 |
| 2 | 100 | 9820 | 4 | 26.0 | 2 | 4.90 | 1.3 | 6.67 | 28.00 |

TABLE 2-continued

Results Of Study Of Properties Of Tomato Ketchup Mixtures Of Example 2

| Sample # (in order tested) | Homog. Press. (in bar) | Viscos (Brook.) | Serum | Cond. | Text. | pH | Salt Per. | Vin. Per. | Tom. Past. Per. |
|---|---|---|---|---|---|---|---|---|---|
| 18 | 100 | 4380 | 7 | 45.8 | 5 | 3.93 | 2.6 | 3.33 | 22.61 |
| 17 | 100 | 6720 | 5 | 42.1 | 3 | 3.98 | 2.6 | 3.33 | 28.00 |
| 26 | 100 | 4430 | 6 | 40.3 | 5 | 3.79 | 2.6 | 6.67 | 22.61 |
| 20 | 100 | 7300 | 6 | 41.6 | 2 | 3.84 | 2.6 | 3.33 | 28.00 |
| 8 | 900 | 9050 | 3 | 22.9 | 1 | 4.01 | 1.30 | 3.33 | 22.61 |
| 10 | 900 | 8070 | 4 | 28.6 | 3 | 4.04 | 1.30 | 3.33 | 28.00 |
| 19 | 900 | 7670 | 2 | 23.7 | 1 | 3.84 | 1.30 | 6.67 | 22.61 |
| 11 | 900 | 10000 | 3 | 18.8 | 1 | 3.90 | 1.30 | 6.67 | 28.00 |
| 25 | 900 | 7520 | 2 | 40.7 | 1 | 3.94 | 2.60 | 3.33 | 22.61 |
| 24 | 900 | 10000 | 1 | 37.1 | 2 | 3.99 | 2.60 | 3.33 | 28.00 |
| 4 | 900 | 7900 | 3 | 42.9 | 2 | 3.79 | 2.60 | 6.67 | 22.61 |
| 21 | 900 | 10000 | 2 | 42.2 | 2 | 3.83 | 2.60 | 6.67 | 28.00 |
| 22 | 100 | 5030 | 5 | 32.7 | 4 | 3.91 | 1.95 | 5.00 | 25.31 |
| 16 | 900 | 9790 | 1 | 32.7 | 2 | 3.91 | 1.95 | 5.00 | 25.31 |
| 1 | 500 | 8500 | 1 | 23.4 | 2 | 3.95 | 1.30 | 5.00 | 25.31 |
| 7 | 500 | 9050 | 3 | 40.6 | 2 | 3.88 | 2.60 | 5.00 | 25.31 |
| 5 | 500 | 9520 | 2 | 32.3 | 1 | 4.00 | 1.95 | 3.33 | 25.31 |
| 15 | 500 | 8400 | 1 | 32.7 | 2 | 3.83 | 1.95 | 6.67 | 25.31 |
| 3 | 500 | 8160 | 3 | 22.0 | 1 | 3.90 | 1.95 | 5.00 | 22.61 |
| 14 | 500 | 10000 | 1 | 29.0 | 1 | 3.93 | 1.95 | 5.00 | 28.00 |
| 9 | 500 | 8870 | 3 | 23.9 | 1 | 3.91 | 1.95 | 5.00 | 25.31 |
| 13 | 500 | 8500 | 1 | 32.4 | 2 | 3.90 | 1.95 | 5.00 | 25.31 |
| 27 | 500 | 8300 | 2 | 31.9 | 1 | 3.91 | 1.95 | 5.00 | 25.31 |
| 28 (commercial) | — | 7800 | 1 | 43.2 | 1 | — | — | — | — |
| 29 (commercial) | — | 9000 | 1 | 34.8 | 1 | — | — | — | — |
| 30 (commercial) | — | 8080 | 1 | 33.7 | 1 | — | — | — | — |

When the above results were statistically analyzed using a SAS computer package typical of those generally available to those in the art, it was determined that there was a negligible correlation between pH, conductivity and viscosity. However there was a correlation between serum separation, texture quality and the Brookfield viscosity measurements. In general, the higher separation and poorer texture measurements corresponded to lower Brookfield viscosity measurements.

Using the above data, it was also possible to determine a relationship between the percentage of tomato paste used, the homogenization pressures and predicted Brookfield viscosities of the resulting products using a computer analysis package typical of those available to those in the art. Expressed in a mathematical formula, that relationship was a quadratic function with the following formula:

$$Pre.Br.Vis.=8811+1344\ ((H-500)/400))+1110\ ((T-25.305)/2.695)-1267\ ((H-500)/400)^2$$

Pre.Br.Vis.=Predicted Brookfield Viscosity
H=Homogenization pressure in bar
T=Tomato paste percentage As mentioned above, FIG. 4 illustrates the above relationship as a contour plot of homogenization pressure (in bar) versus tomato paste percentage (at 31% net total tomato solids content), and indicates with contour lines the expected viscosities of tomato ketchup samples processed as indicated above using the data collected in Table 2. Using this contour plot, tomato ketchup samples subject to homogenization pressure of between about 650 bar (9,425 psi) to about 800 bar (11,600 psi) will optimize the viscosity of the ketchup samples containing from about 22.5% to about 28.0% tomato paste (i.e. about 7.0% to 8.68% net total tomato solids). The plot also indicates that using ketchup samples made with about 25.3% tomato paste (i.e., about 7.85% net solid tomato solids) and a homogenization pressure of about 700 bar (10,150 psi), the predicted Brookfield viscosity would be over about 9,000 cP. This would be equal to or greater than the tested commercially available ketchup products.

Figure 7:
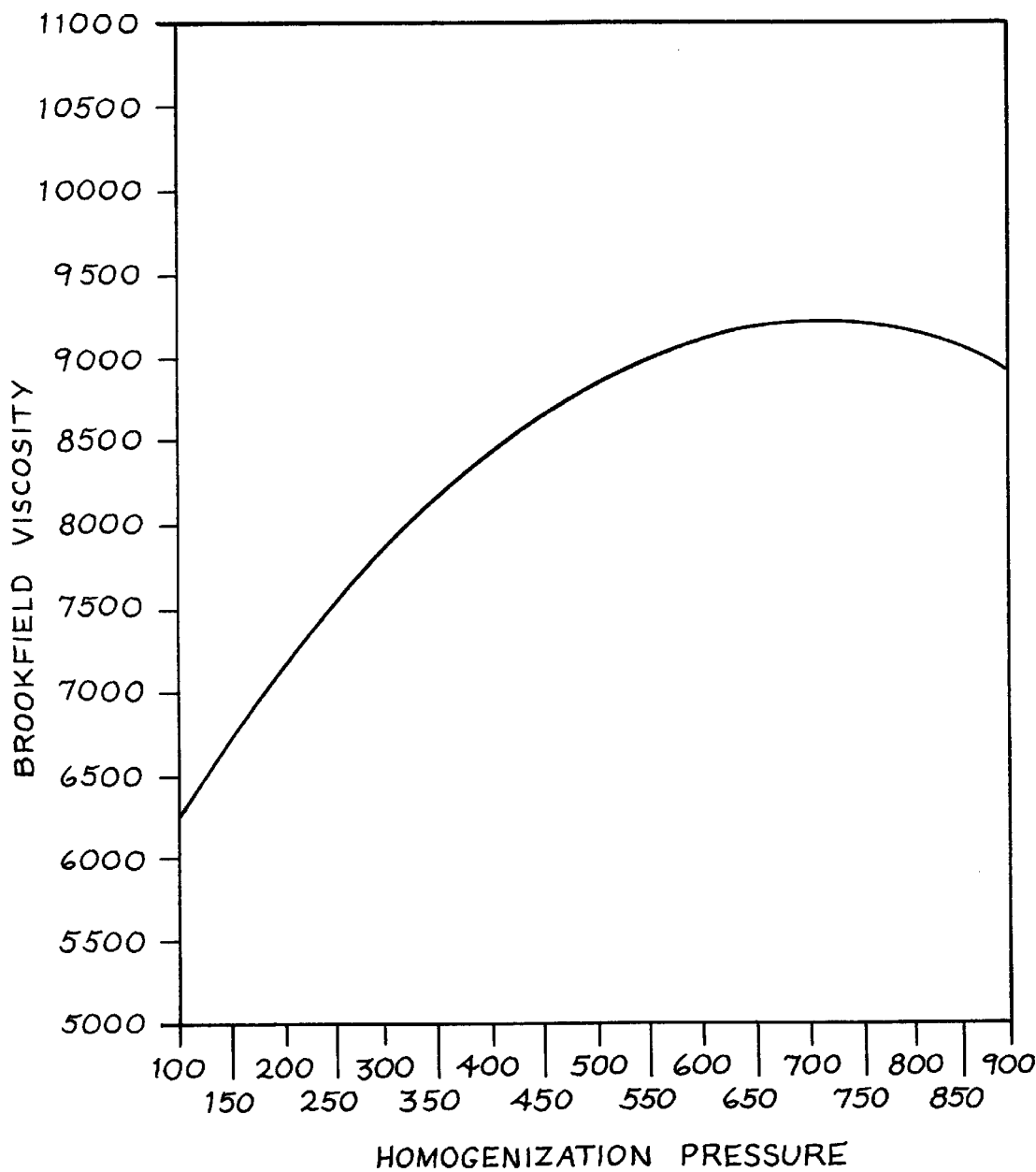
FIG. 7 is a plot of homogenization pressure (in bar) versus predicted Brookfield viscosity of a tomato ketchup product processed in accordance with the invention.

Similarly, FIG. 7 is a plot of predicted Brookfield viscosities versus homogenization pressures for the tomato ketchup mixtures of Example 2. This plot confirms that the maximum predicted viscosities were obtained at about 700 bar (10,015 psi) to 750 bar (10,875 psi). This plot further demonstrates that the method of the invention produces products with desirable viscosities at higher homogenization pressures than believed possible without significant adverse effects to other properties of the product.

Also as mentioned above, a contour plot such as FIG. 4 may be developed as described above for other formulations of tomato-based products to estimate the expected viscosity of such products processed in accordance with the above methods. Using this approach, the optimum values for tomato paste content and homogenization pressures in excess of about 5,000 psi (345 bar) may be determined for the product. For example, with such an approach, it is possible to determine the minimum amount of tomato paste (and from that the net total tomato solids) necessary to obtain a desired expected viscosity for the tomato-based product in accordance with the contours of a plot similar to that of FIG. 4. Hence, it may be possible to reduce costs for such products by reducing the tomato paste (and tomato solids content) of the product while maintaining predicted Brookfield viscosities for the product in a specified target range.

EXAMPLE 3

The effect of the net total tomato solids content of a tomato paste processed pursuant to the invention, prior to cooking or mixing, was also studied. A series of tomato pastes or slurries with three different net total tomato solids were homogenized as discussed above. The homogenized pastes were mixed with sweeteners, spices, sugars, salt and other flavorings to make barbecue sauce mixtures following the basic recipe listed above in Table 3. The sauce mixtures were then cooked and dispensed into appropriate holding containers. The properties, including viscosities, of the barbecue sauces were evaluated and compared with control samples made following the standard recipe listed below in Table 3 with a standard commercially available tomato paste.

TABLE 3

Barbecue Sauce Formula

| Ingredients | Percentage in Sample |
|---|---|
| Water | 20–40 |
| Sugar | 15–30 |
| Tomato Paste | 5–20 |
| Vinegar | 5–15 |
| Molasses | 2–12 |
| Salt | 1–4 |
| Starch | 0–4 |
| Smoke Flavor | 0–6 |
| Spices | 0–4 |

The three experimental tomato pastes with different net total tomato solids content were made from tomato paste purchased from commercial sources. As determined by the commercial processor, that starting paste had an about 31% net total tomato content and a 0.060 screen size. The commercial paste then was mixed with water to produce a first paste with about a 22% net total tomato solids content, a second paste with about a 25% net total tomato solids content, and a third paste with about a 28% net total tomato solids content. Similarly, control samples of a 0.040 screen size tomato paste, which is typically used for preparing barbecue sauces, were obtained from commercial sources for comparison purposes. The net total tomato content of the control paste was about 31%, as determined by the commercial processor. The net total tomato solids content determined by a microwave moisture analysis indicated that the commercial control paste had about 34.2% ±2%, net total tomato solids content.

The control tomato pastes were used to prepare two control barbecue sauces following standard ranges of tomato paste, water, spices, salt and sweeteners as listed in Table 3. After the addition of water and other ingredients, the control barbecue sauces had about 6.2% net total tomato solids content.

For each sauce (experimental and control), the dry ingredients and liquid ingredients were separately weighed, mixed and portioned into batch quantities. One of each dry portion was then stirred together with the water and tomato paste in a steam jacketed mixer. Next, the molasses and liquid smoke flavor were added, and the ingredients were mixed for a total of 15 minutes. After 10 minutes of mixing, the vinegar was added to the mixture. The product then was heated to about 195° F. (90.5° C.) for 5 minutes, which was followed by cooling to about 80° F. (26.7° C.).

For the study, a quantity of each of the three experimental tomato pastes was homogenized pursuant to the above described procedures using a 30.79H Rannie™ homogenizer, with an inlet temperature of about 70° F. (31.6° C.). A first quantity of each three of the experimental tomato pastes was homogenized at a pressure of about 5,000 psi (345 bar), and a second quantity of each of the three experimental pastes was homogenized at about 8,000 psi (552 bar).

As shown in Table 4 below, each of the three homogenized experimental tomato pastes were used to make samples of two barbecue sauces with different net total tomato solids content following the above recipe. In one set of experimental barbecue sauces, sufficient homogenized tomato paste was added to obtain a barbecue sauce mixture with a net total tomato solids content of 10% less than the control barbecue sauces (i.e. about 5.58% net total tomato solids). The same procedure was followed with the other set of experimental barbecue sauces, but they were formulated to have a net total tomato solids content 15% less than the control barbecue sauce (i.e. about 5.27% net total tomato solids content). After the adjustment for the water content of each experimental tomato paste, the ingredients for the experimental barbecue sauces were otherwise the same as the control barbecue sauces, and they were prepared using the same mixing and cooking steps.

The properties of the control barbecue sauces, including their viscosity, were evaluated and compared to those of the experimental barbecue sauces, as shown in Table 4 below. The control barbecue sauces are identified in Table 4 as samples Nos. 1 and 2. The experimental barbecue sauces are identified as samples Nos. 3–14. All net total tomato solids amounts are plus or minus about 2%. "NTTS" refers to "Net Total Tomato Solids".

TABLE 4

| Sample No. | Percentage NTTS in Homg. Paste | % Reduction Of Tom. Solids In Sample | Homg. Pressure (psi) | Viscosity (cPs) |
|---|---|---|---|---|
| 1 (0.045 control) | 31–34.2 | — | — | 8,520 |
| 2 (0.045 control) | 31–34.2 | — | — | 8,140 |
| 3 | 22–23.7 | 10 | 5000 | 8,900 |
| 4 | 22–23.7 | 15 | 5000 | 8,780 |
| 5 | 22–23.7 | 10 | 8000 | 9,720 |
| 6 | 22–23.7 | 15 | 8000 | 10,600 |
| 7 | 25–26.8 | 10 | 5000 | 9,300 |
| 8 | 25–26.8 | 15 | 5000 | 8,640 |
| 9 | 25–26.8 | 10 | 8000 | 10,000 |
| 10 | 25–26.8 | 15 | 8000 | 9,240 |
| 11 | 28–30 | 10 | 5000 | 8,340 |
| 12 | 28–30 | 15 | 5000 | 8,120 |
| 13 | 28–30 | 10 | 8000 | 9,840 |
| 14 | 28–30 | 15 | 8000 | 8,080 |

Figure 8:
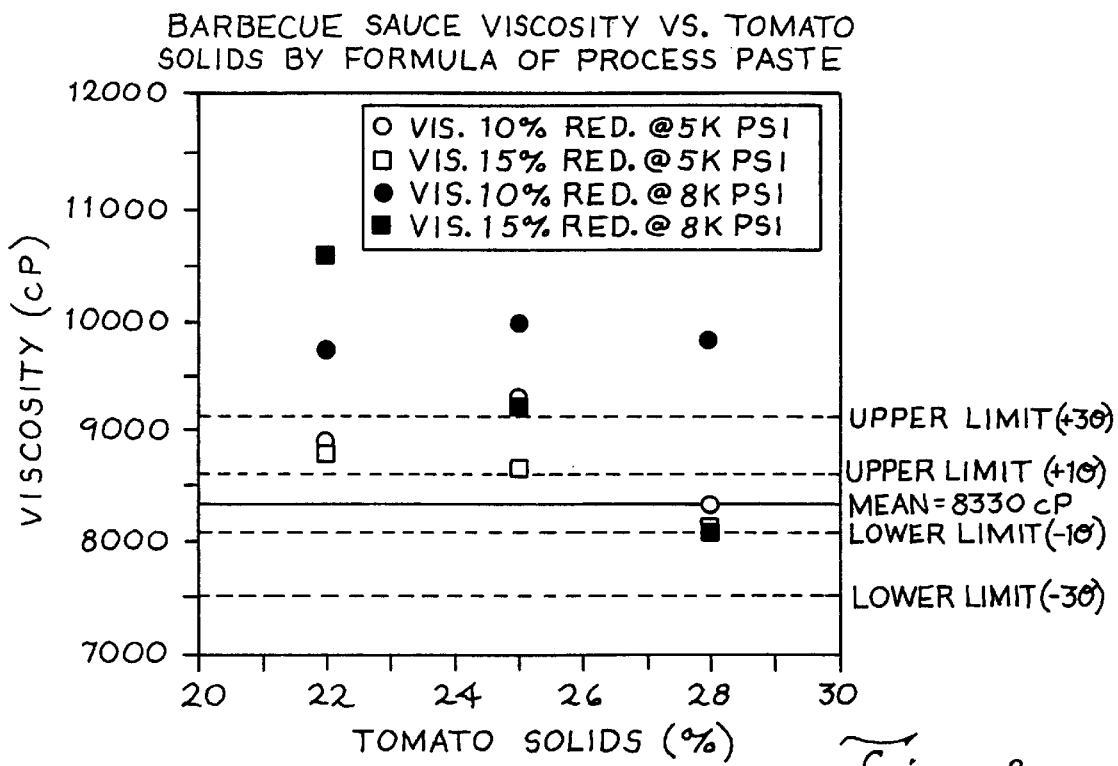
FIG. 8 is a plot of tomato solids percentage versus viscosity (in cP) for barbecue sauces made from tomato pastes processed in accordance with the invention.

The results of this study further are summarized in FIG. 8, where the viscosity of each sample is plotted against the net total tomato solids content of the homogenized pastes used to make the sauces. In FIG. 8, the solid line titled "Mean +8330 cP" indicates the mean of the viscosities of the control barbecue sauces (made from 0.040 screen size tomato pastes having about 31–34.2% net total tomato solids content). The dotted lines in FIG. 8 indicate the upper and lower variations from that mean, from an upper limit of +3δ to a lower limit of −3δ.

As illustrated in FIG. 8, all of the experimental barbecue sauces demonstrated viscosities at or above the barbecue sauces made with the control pastes. It is believed that the observed decrease in the viscosities of the samples Nos. 3–14, with increasing amounts of tomato solids content, was due to variations in the processing conditions inherent in the operation of the pilot plant used for the study. The "cling" characteristics of the experimental sauces (the sauces' ability to adhere to food products) also were as good as, if not better than, the control sauces.

This confirmed that the viscosity enhancing advantages of the invention apply to tomato slurries and pastes with a wide range of net total tomato solids. It also confirms that the invention permits the use of reduced amounts of tomato solids, and the resulting cost saving, to prepare a tomato-based product with properties similar to, if not exceeding, existing products. In addition, the above study demonstrates that the advantages of the invention apply to tomato pastes and slurries that are first homogenized and then subsequently mixed, processed and cooked.

EXAMPLE 4

Figure 9:
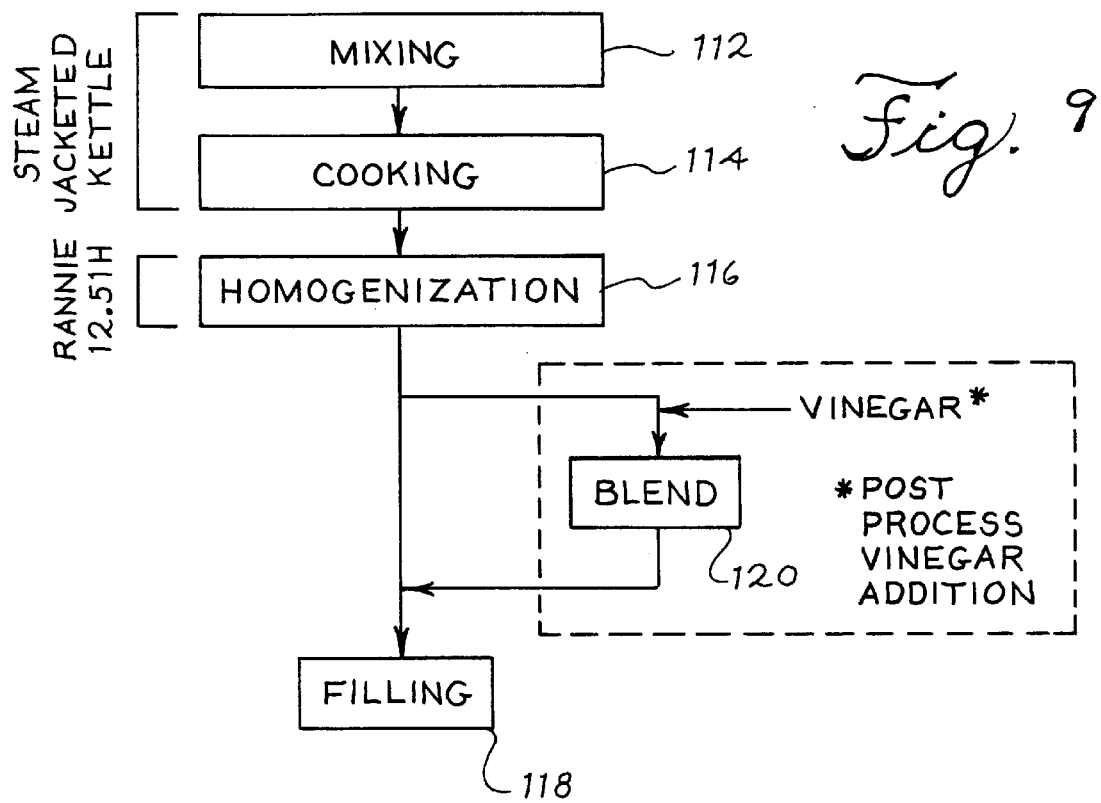
FIG. 9 is a schematic block drawing of another embodiment of the method of the invention for processing tomato-based products with vinegar added after the homogenization step.

The schematic of FIG. 9 illustrates an alternative process for preparing a homogenized tomato-based product where the post-homogenization acidity of the product is adjusted to enhance the gel-type setting effect of the naturally occurring pectin in the tomato solids. In the preferred embodiment, an amount of a food grade acetic acid equal to about 4% to about 8% by weight of the slurry or sauce was added for that purpose. A ketchup mixture was prepared using ingredients such as those in Example 1, but the amount of tomato paste (about 31% net total tomato solids and 0.060 screen size) was used, with the amount of tomato paste reduced by 10% in some samples and 20% in other samples. Referring to the block schematic of method 110 shown in FIG. 8, the ingredients were measured and heated to about 45° C. in a mixing step 112 similar to that discussed above in Example 1. The mixture was then heated in a cooking step 114 by steam injection to about 80° C. (rather than 90° C. as in Example 1).

Samples of the mixture were then transferred to Rannie™ 12.51H homogenizer for the homogenization step 116 at pressures of about 100 bar (1,450 psi), 500 bar (7,250 psi) and 900 bar (13,050 psi). The samples were transferred to glass bottles while at temperatures exceeding 75° C. in a filling step 118. However, as can be seen in FIG. 8, the samples were subject to an additional blending step 120 prior to the filling step 118, where an amount of food grade acetic acid totaling about 4% to 8% by weight of the slurry or sauce in the form of vinegar, was added to the mixture after the homogenization step 116.

Method 110, with the additional vinegar blending step 120, produced tomato ketchup products with a higher initial viscosity when compared to other homogenized samples prepared without the additional vinegar blending step 120. The plot of time (days) versus viscosity shown in FIG. 10 compares five different samples illustrating the changes in viscosities of such tomato ketchup samples over time. These samples included: (1) a standard formula ketchup homogenized at about 250 bar (3,625 psi); (2) a sample homogenized at about 600 bar (8,700 psi) with an about 10% reduction in tomato paste; (3) a sample homogenized using a Gaulin or "dairy" type homogenizer at about 250 bar (2,900 psi); (4) a sample homogenized at about 1,000 bar (14,500 psi) with an about 10% reduction in tomato paste and a post-homogenization addition of vinegar; and (5) a sample homogenized at about 600 bar (8,700 psi) with an about 10% reduction in tomato paste and a post-homogenization addition of vinegar. The Gaulin type homogenizer uses a two-stage homogenizing procedure commonly used to homogenize dairy products. The first stage is at about 250 bar (3,625 psi) and the second stage is at about 34.5 bar (500 psi).

Figure 10:
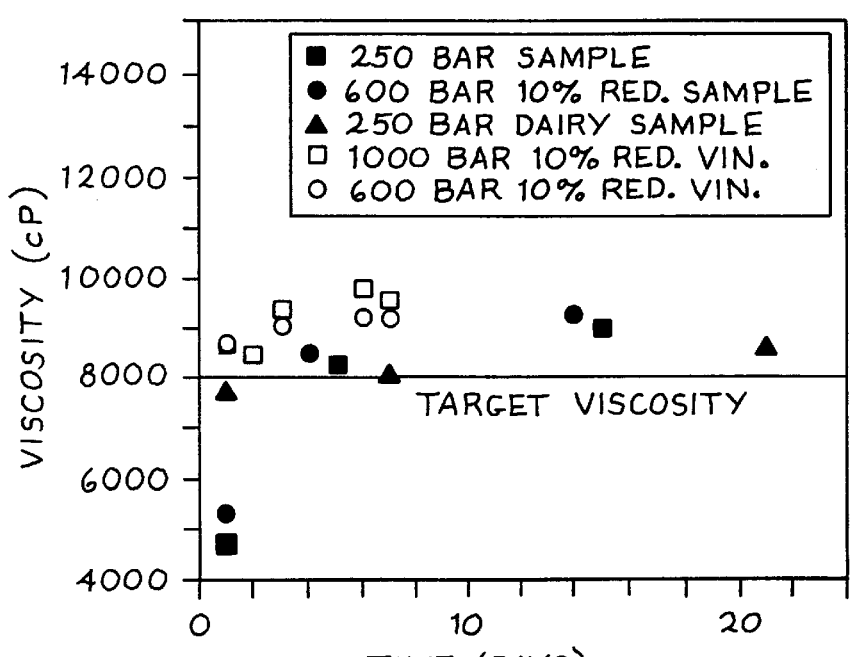
FIG. 10 is a plot of time versus viscosity of five tomato ketchup samples processed in accordance with the invention, three of such samples having vinegar added after the homogenization step.
Figure 11:
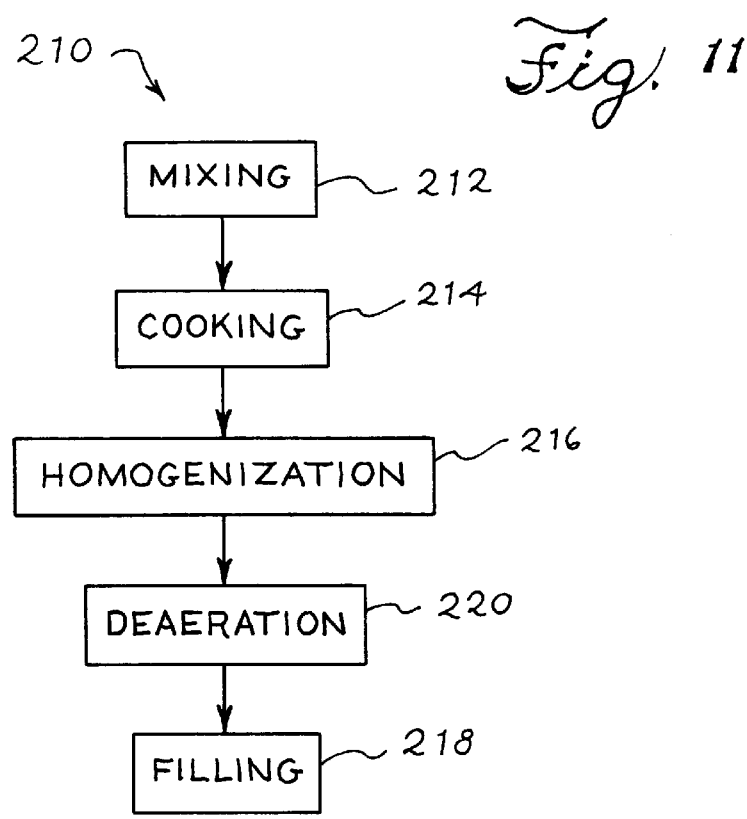
FIG. 11 is a schematic block drawing of another embodiment of the method of the invention for processing tomato-based products with a deaeration step added after the homogenization step.

As shown in FIG. 10, the viscosities of the samples homogenized at about 600 bar (8,700 psi) and with an about 10% reduction in tomato paste demonstrated viscosities similar to the standard formula homogenized at 250 bar (3,625 psi). The viscosities of the samples homogenized at about 600 bar (8,700 psi) and about 1000 bar (14,500 psi), with an about 10% reduction in tomato paste and with vinegar added in a post-homogenization step 120 had initial viscosities that were higher than the samples without the vinegar addition, as well as the samples homogenized with the Gaulin or dairy type homogenizer. The samples with a 20% reduction in tomato paste demonstrated viscosities less than that of the 10% reduced product or the standard formula. Moreover, over time, the increases in the viscosity of the samples with post-homogenization vinegar additions were not as significant in those samples lacking that addition.

EXAMPLE 5

Another example of the method of the invention was directed to processing improvements to a tomato-based barbecue sauce product. In this example, a 0.060 screen size tomato paste was used to prepare a mixture with an about 22% net total tomato solids content. This mixture was then processed at 8,000 psi (551 bar) in a Rannie™ 30.79H homogenizer and then, after homogenization, was mixed with sweeteners, spices, salt and other ingredients and were cooked to make the desired barbecue sauce samples using the recipe discussed above in Example 3. These samples were prepared in about 20 pound batches in open, jacked mixers at about 92° C., following steps similar to those discussed in Example 3 above. In addition, samples of that tomato paste were homogenized at pressures from about 5,000 psi (345 bar) to about 11,000 psi (759 bar) and were used to prepare similar barbecue sauces.

Analytical and sensory analysis of those barbecue sauce samples indicated that the viscosities of these samples were increased with no significant adverse effects to the texture of the finished 0.060 tomato paste at homogenization pressures from about 5,000 psi (345 bar) to 11,000 psi (759 bar). Analytical testing indicated that the greatest increase in the viscosities of the samples was at homogenization pressures of about 5,000 psi (345 bar) to 8,000 psi (552 bar), and the greatest viscosity increase for the 0.060 tomato paste was at a homogenization pressure of about 8,000 psi (552 bar). In addition, the sensory analysis also indicated that samples with a 10% reduction in tomato paste would be considered comparable to the Control barbecue sauce made with 0.045 screen size tomato paste.

Based on those studies, it was believed that the tomato paste content (as a result, the net total tomato solids content) in such products could be reduced by as much as 15% following the method of the invention. Moreover, in a related study, a tomato paste with an about 28% net total tomato content and 0.060 screen size was homogenized with the Rannie™ 30.79H apparatus. This homogenized tomato paste was then processed and cooked into a barbecue sauce following the procedures mentioned above. It was determined that this sauce also had a viscosity and other characteristics comparable to a barbecue sauce made with a 0.045 screen size.

EXAMPLE 6

Another embodiment of the invention includes adding a starch to a tomato-based product, such as a ketchup product, as a thickener and stabilizer. In this embodiment, a tomato ketchup mixture of tomato paste (about 0.060 screen size and about 31% net total tomato solids) was mixed with water, sugar and sweeteners, salt and spices in the proportions discussed above in Example 1. The mixture was homogenized in a high pressure, high shear Rannie™ 12.51H homogenizer as discussed above at pressures of about 800 bar (11,600 psi). After homogenization, 1% by weight of a starch (National 465) was added to samples of the mixture and the samples were cooked as discussed above in Example 1. The texture and viscosity of the starch modified samples were improved over similar samples that did not contain the starch additive.

EXAMPLE 7

In another embodiment, 4% by weight of a corn syrup was added to a tomato ketchup mixture to investigate the benefits of such an addition to the texture of a tomato-based product processed in accordance with the invention. The corn syrup included high fructose corn syrup 42 and corn syrup 25 DE-42 Cleardex (Cargill).

These samples were prepared using a tomato ketchup mixture of tomato paste (about 0.060 screen size and about 31% net total tomato solids) was mixed with water, sugar and sweeteners, salt and spices in the proportions discussed above in Example 1. To certain samples from this mixture, 4% by weight of high fructose corn syrup 42 was added to certain other samples from this mixture corn syrup 25 DE-42 Cleardex was added. Then, the experimental mixtures, as well as samples with no added corn syrup, were cooked and homogenized as discussed above at pressures of about 800 bar (11,600 psi). The texture of both sets of experimental samples evidenced improved textures when compared to the samples without the added corn syrup.

In FIG. 11, an alternative embodiment of the invention 210 is shown. In that embodiment, the ingredients for a tomato-based product are heated, preferably to about 45° C., and blended in a mixing step 212. The mixture is heated by steam infusion in a cooking step 214, preferably at about 92° C. The mixture is homogenized using a Rannie™ 12.51H or 30.79H type homogenizer at pressures that are appropriate for the desired product viscosity, as discussed above, in a homogenization step 216. The product may be transferred to appropriate bottles or containers in a filling step 218, but only after the product is subject to a deaeration step 220.

In the deaeration step 220, air or gases entrained in the product stream are removed by exposing the product stream to a vacuum chamber, such as those known in the art. The deaeration step 220 is preferably carried out by passing the homogenized product through a chamber with a reduced atmospheric pressure of about 400 mbar (12 in. Hg). It is believed that this step increases liquid or serum retention in the product.

Hence, the invention provides for the treatment of tomato-based products to increase their viscosity with high pressure, high shear homogenization, at homogenization pressures greater than those previously believed to be desirable. The invention further permits the reduction of the amount of tomato solids in a tomato-based product, with the resulting cost savings, while maintaining product quality and sensory appeal. The above examples and disclosures further should not be considered as limiting the invention to that particular subjection matter.

Similarly, while the invention has been described by reference to certain specific descriptions and examples that illustrate preferred materials, configurations and conditions, it should be understood that the invention is not limited thereto. Rather, all alternatives, modifications and equivalents within the scope and spirit of the invention so described are considered to be within the scope of the appended claims.

What is claimed is:

1. A method for preparing a tomato-based product of increased viscosity made of a first slurry including at least a first phase comprising at least about 6% tomato solids by weight and a second phase of water, the method comprising subjecting the first slurry to high pressure, high shear homogenization at homogenization pressures of at least about 5,000 psi, which homogenization pressure and a temperature of homogenization which is effective for providing a viscosity increase to at least about a viscosity of a second slurry which has not undergone the high shear homogenization and which second slurry comprises at least about 10 percent more tomato solids than the product made from the first slurry without significant loss of color and liquid retention.

2. The method of claim 1 wherein the slurry comprises at least about 6% to about 31% by weight of the first phase of tomato solids.

3. The method of claim 1 wherein the slurry comprises at least about 20% to about 31% by weight of the first phase of tomato solids.

4. The method of claim 1 wherein the first phase of tomato solids is provided by mixing a tomato paste of at least screen size of about 0.045 to 0.060 with water.

5. The method of claim 4 wherein the first phase of tomato solids is provided by mixing a tomato paste of about screen size 0.060 with water.

6. The method of claim 4 wherein the net total tomato solids content of the tomato paste is about 28% to about 31% by weight.

7. The method of claim 1 wherein the slurry is subject to high pressure, high shear homogenization at homogenization pressures from about 8,000 psi to about 11,000 psi.

8. The method of claim 1 wherein the slurry is introduced into a high pressure, high shear homogenizer at a temperature of between at least about 20° C. and about 80° C.

9. The method of claim 1 wherein an amount of a food grade acid effective to increase the viscosity of the slurry is added to the slurry after the slurry is homogenized.

10. The method of claim 9 wherein the food grade acid is vinegar comprising about 4% to about 8% by weight of the slurry.

11. The method of claim 1 wherein an amount of 4% corn syrup effective to increase the viscosity of the slurry is added to the slurry.

12. The method of claim 1 wherein an amount of 1% starch effective to improve the viscosity of the slurry is added to the slurry after the slurry is homogenized.

13. A method for increasing the viscosity of a tomato sauce comprising blending together tomato paste and water to make a first slurry having at least a first phase comprising at least about 6% tomato solids by weight and a second phase of water, homogenizing the first slurry at pressures of at least about 5,000 psi to about 14,500 psi, which homogenization pressure and a temperature of homogenization which is effective for providing a viscosity increase to at least about a viscosity of a second slurry which has not undergone the high shear homogenization and which second slurry comprises at least about 10 percent more tomato solids than the product made from the first slurry without significant loss of color and liquid retention, and transporting the homogenized blend to appropriate storage containers.

14. The method of claim 13 wherein the homogenization pressures are from about 8,000 psi to about 11,000 psi.

15. The method of claim 13 wherein the tomato paste used to make the slurry comprises at least about 6% to about 31% net total tomato solids, and has a screen size of at least about 0.045.

16. The method of claim 15 wherein the slurry comprises at least about 28% to about 31% by weight tomato solids.

17. The method of claim 13 wherein the slurry is deaerated after homogenization.

18. The method of claim 13 wherein the slurry is subjected to elevated temperatures for a time sufficient to work the slurry.

19. A method for making a tomato ketchup with improved viscosity and reduced tomato solids comprising:

providing a first tomato-based slurry comprising water, at least about 6% tomato solids by weight, sweeteners, spices and seasonings;

cooking the mixture; and subjecting the mixture to high shear, high pressure homogenization at a pressure of at least about 5,000 psi, which homogenization pressure and a temperature of homogenization which is effective for providing a viscosity increase to at least about a viscosity of a second slurry which has not undergone the high shear homogenization and which second slurry comprises at least about 10 percent more tomato solids than the product made from the first slurry without significant loss of color and liquid retention.

20. A tomato ketchup having an increased viscosity comprising a first slurry including at least a first phase comprising at least about 6% tomato solids by weight and a second phase of water, the viscosity of said ketchup increased by subjecting the first slurry to high pressure, high shear homogenization pressures of at least 5,000 psi, which homogenization pressure and a temperature of homogenization which is effective for providing a viscosity increase to at least about a viscosity of a second slurry which has not undergone the high shear homogenization and which second slurry comprises at least about 10 percent more tomato solids than the product made from the first slurry without significant loss of color and liquid retention.

21. The ketchup of claim 20 wherein the ketchup is prepared using a tomato sauce comprising about 20% to about 31% by weight of net total tomato solids.

22. The ketchup of claim 20 wherein the ketchup comprises a blend of water and of tomato sauce having a net total tomato solids content of from at least about 6% to about 31% by weight, and a screen size of at least about 0.045.

23. The tomato ketchup slurry of claim 20 wherein the ketchup comprises about 4% to about 8% by weight of a food grade acid; the acid added after the ketchup is homogenized.

24. The tomato ketchup of claim 20 wherein about 1% starch solution is added to the ketchup; the starch solution added after the ketchup is homogenized.

25. The tomato ketchup of claim 20 wherein about 4% corn syrup solution is added to the ketchup.

\* \* \* \* \*